(12) United States Patent
Tomic et al.

(10) Patent No.: US 8,190,648 B1
(45) Date of Patent: *May 29, 2012

(54) METHOD AND SYSTEM FOR THE STORAGE AND USE OF ENGINEERING MODELING ALTERNATIVES WITH UNITIZED DATA

(75) Inventors: Sasa Tomic, Astoria, NY (US); Scott P. Devoe, New London, NH (US); Benjamin D. Wilson, Keene, NH (US); Jack S. Cook, Jr., Bethlehem, CT (US)

(73) Assignee: Bentley Systems, Incorporated, Exton, PA (US)

( * ) Notice: Subject to any disclaimer, the term of this patent is extended or adjusted under 35 U.S.C. 154(b) by 1632 days.

This patent is subject to a terminal disclaimer.

(21) Appl. No.: 11/132,961

(22) Filed: May 19, 2005

Related U.S. Application Data

(62) Division of application No. 10/145,841, filed on May 14, 2002, now Pat. No. 7,107,280.

(51) Int. Cl.
*G06F 7/00* (2006.01)
*G06F 17/30* (2006.01)

(52) U.S. Cl. ............ 707/793; 707/797; 707/805; 703/9; 703/10

(58) Field of Classification Search ................ 703/9, 10; 707/793, 797, 805
See application file for complete search history.

(56) References Cited

U.S. PATENT DOCUMENTS

| | | | |
|---|---|---|---|
| 5,511,188 A | 4/1996 | Pascucci et al. | |
| 5,758,347 A | 5/1998 | Lo et al. | |
| 5,787,283 A | 7/1998 | Chin et al. | |
| 6,119,125 A | 9/2000 | Gloudeman et al. | |
| 6,247,019 B1 | 6/2001 | Davies | |
| 6,374,241 B1 | 4/2002 | Lamburt et al. | |
| 6,393,415 B1 | 5/2002 | Getchius et al. | |
| 6,421,683 B1 | 7/2002 | Lamburt | |
| 6,519,592 B1 | 2/2003 | Getchius et al. | |
| 6,556,924 B1 * | 4/2003 | Kariyawasam et al. | 702/34 |
| 6,711,514 B1 * | 3/2004 | Bibbee | 702/84 |
| 6,853,997 B2 | 2/2005 | Wotring et al. | |
| 7,013,248 B1 * | 3/2006 | Todini et al. | 703/2 |
| 2001/0032274 A1 * | 10/2001 | Asami et al. | 709/318 |

(Continued)

OTHER PUBLICATIONS

Hadzilacos et al., Computers, Environment and Urban Systems 24 (2000) 215-232.*

(Continued)

*Primary Examiner* — Shew-Fen Lin
(74) *Attorney, Agent, or Firm* — Cesari and McKenna, LLP

(57) ABSTRACT

A database design modeling system for managing data facets for design scenarios as a collection of hierarchical unitized data alternatives is provided. The database design model allows for easy access to data while providing a single persistent location for any one specific data record, thereby reducing any problems associated with conventional data duplication. Further, all data stored within the database is unitized thus eliminating the need for the user to do the unit mapping. According to one aspect of the present invention, a Relational Database Management System (RDBMS) modeling system can be constructed that allows for exercising multiple "What if?" scenarios with minimal user intervention and errors by 1) storing data using a normalized hierarchical storage structure, 2) providing data address indirection means to access data available from a multitude of data sources, 3) providing an object model to leverage programmable support to the orthogonal data views, and 4) providing a GIS client user interface allowing the user to construct a scenario and to view scenario results.

27 Claims, 13 Drawing Sheets

U.S. PATENT DOCUMENTS

| | | | |
|---|---|---|---|
| 2002/0010572 A1* | 1/2002 | Orton et al. | 703/22 |
| 2003/0167455 A1* | 9/2003 | Iborra et al. | 717/105 |
| 2003/0217063 A1 | 11/2003 | Tomic et al. | |
| 2004/0216030 A1* | 10/2004 | Hellman et al. | 715/500 |

OTHER PUBLICATIONS

ESRI, "ModelBuilder for ArcView Spatial Analyst 2", May 2000.*

White (1999 ESRI User Conference Proceedings, "Using GIS to Implement Hierarchical Organization in Water Distribution System Simulation Model").*

Rossman et al. ("EPANET 2 Users Manual", Sep. 2000, EPA).*

Boulos, Paul F. et al. "Explicit Calculation of Pipe-Network Parameters," Journal of Hydraulic Engineering, Mar. 5, 1990, pp. 1329-1344.

Cheun, K. "Performance Comparison of Frequency-hop Spread-Spectrum Multiple-Access Networks Using Different Modulation Orders", Department of Electrical and Electronics Engineering, Pohang Institute of Science and Technology (POSTECH), So. Korea; Sep. 6, 1993-Sep. 11, 1993.

Chazelle et al., "An Optimal Algorithm for Intersecting Line Segments in the Plane", Journal of the ACM, vol. 39, No. 1, ACM Press, New York, NY, Jan. 1992, pp. 1-54.

Abbadi et al., "Maintain Availability in Partitioned Replicated Databases", ACM Transactions on Database Systems, vol. 14, No. 2, ACM Press, New York, NY, Jun. 1989, pp. 264-290.

* cited by examiner

Physical Alternative: 2010 with an Additional Reservoir

| Pipe | Pump | Valve | GPV | Junction | Reservoir | Tank |

Pipe

| | Label | Material | Diameter (in.) | Hazen-Williams C | Minor Loss Coefficient | Check Valve? |
|---|---|---|---|---|---|---|
| * | | | | | | |
| 1 | P-1 | Ductile Iron | 100.0 | 130.0 | 0.00 | ☐ |
| 2 | P-2 | Ductile Iron | 6.0 | 112.0 | 0.00 | ☐ |
| 3 | P-3 | Ductile Iron | 6.0 | 112.0 | 0.00 | ☐ |
| 4 | P-4 | Ductile Iron | 6.0 | 112.0 | 0.00 | ☐ |
| 5 | P-5 | Ductile Iron | 6.0 | 112.0 | 0.00 | ☐ |
| 6 | P-6 | Ductile Iron | 6.0 | 112.0 | 0.00 | ☐ |
| 7 | P-7 | Ductile Iron | 6.0 | 112.0 | 0.00 | ☐ |
| 8 | P-8 | Ductile Iron | 6.0 | 112.0 | 0.00 | ☐ |
| 9 | P-9 | Ductile Iron | 6.0 | 112.0 | 0.00 | ☐ |

☑ = Base Data   ☐ = Inherited Data   ☑ = Local Data

[Report]   [Close]   [Help]

FIG. 7

FlexUnits

| | Attribute Type | Unit | System | Display Precision | Scientific notation |
|---|---|---|---|---|---|
| 1 | Angle | degrees | US | 2 | ☐ |
| 2 | Area | ft2 | US | 1 | ☐ |
| 3 | Coefficient | | None | 2 | ☐ |
| 4 | Coefficient - Ellipse | | None | 6 | ☑ |
| 5 | Coefficient - Polynomial | | None | 4 | ☐ |
| 6 | Coefficient - Weir | US | US | 2 | ☐ |
| 7 | Concentration | mg/l | Both | 2 | ☐ |
| 8 | Convergence | | None | 6 | ☐ |
| 9 | Coordinate | ft | US | 2 | ☐ |
| 10 | Cost | $ | None | 0 | ☐ |
| 11 | Cost per Unit Energy | $/kWh | Both | 2 | ☐ |
| 12 | Cost per Unit Length | $/ft | US | 0 | ☐ |
| 13 | Cost per Unit Power | $/kW | Both | 2 | ☐ |
| 14 | Cost per Unit Volume | $/gal | US | 2 | ☐ |
| 15 | Cross Slope | ft/ft | US | 3 | ☐ |

[ OK ]  [ Cancel ]  [ Use Defaults ]  [ Help ]

METHOD AND SYSTEM FOR THE STORAGE AND USE OF ENGINEERING MODELING ALTERNATIVES WITH UNITIZED DATA

CROSS-REFERENCE TO RELATED APPLICATIONS

The present application is a divisional of commonly assigned copending U.S. patent application Ser. No. 10/145,841, which was filed on May 14, 2002, now U.S. Pat. No. 7,107,280 by Tomic, et al., for a METHOD AND SYSTEM FOR THE STORAGE AND USE OF ENGINEERING MODELING ALTERNATIVES WITH UNITIZED DATA, which is hereby incorporated by reference.

BACKGROUND OF THE INVENTION

1. Field of the Invention

The present invention relates to database management, and more particularly, to persistence and management of multi-faceted engineering models using unitized data.

2. Background Information

Conventional engineering models are exercised using a predefined set of input data. Such input data sets are commonly constructed of specific and potentially changing sets of facets, such as location, physical properties, loading, etc. The ability to easily access, modify, and recombine these facets is one of the paramount objectives in a good model. Modeling involves the iterative analysis of a multitude of "What if?" scenarios that evaluate different facets of the data. Conventional iterative modeling environments typically consist of the time consuming tasks of 1) copying a multitude of datasets or databases into a computer work area or storage area, 2) making necessary modifications to the selected data elements included in these datasets, and 3) re-executing the model. There are two primary disadvantages to this type of modeling environment: the multiple data duplication operations may create data errors, and the data duplication does not optimize computer storage space.

For example, a model representation of a water distribution network may include incorrectly entered data regarding a particular element. Such network data may then be copied and more data added to represent a post-development condition of the network, thus forming a new "What If?" scenario. Upon discovery of the original error, any set of data that used the original erroneous entry would then require modification and assurance that it was edited correctly.

Furthermore, data used in engineering applications is by its nature unitized, i.e. each input value is associated with a corresponding measuring unit. Values without defined measuring units do not provide sufficient information to a modeling application to be evaluated appropriately. Traditionally, this problem has been solved by forcing the users of an engineering application to use a predefined set of units. Such a limitation can be constraining in that when application units do not match the data units provided by a database, the user thus needs to perform unit transformation outside of the application, and is required to know an exact mapping relationship between the application units and the units of the input data. Such a unit transformation process may introduce errors, thus invalidating modeling results. Such errors are typically hard to detect and often go unnoticed.

Finally, forcing the input data units to match application units introduces strong coupling between the application and input data. If the application units need to be changed, existing input data may need to be changed as well, further introducing potential errors into the data.

There remains a need, therefore, for a system for managing engineering modeling data that reduces the number of errors carried forward in data duplication in the model. There remains a further need for a system that allows unitized data to be readily manipulated and converted into different unit formats.

SUMMARY OF THE INVENTION

The disadvantages of prior techniques are addressed by the present invention, which provides a database design and engineering modeling system for managing data facets for design scenarios as a collection of hierarchical unitized data alternatives. A database design model allows for easy access to data while providing a single persistant location for any one specific data record, thereby reducing disadvantages associated with conventional data duplication. Further, the data stored within the database is unitized thus eliminating the need for the user to do the unit mapping.

In addition, management software including an interface-based object model allows a project programmer to access and manipulate data by an alternative inheritance scheme which allows changes in scenarios, or simply updates to the data, to be made readily without data duplication, which could otherwise lead to error propagation. An object model is integrated with the database to perform these tasks.

According to this aspect of the invention, a relational database management system (RDBMS) can be constructed that allows for exercising multiple "What if?" scenarios with minimal user intervention and errors. As used herein, the term "What If?" scenario represents the notion that a specific, individual scenario represents the "complete" data content for a particular, modeled engineering system "whole". A scenario can therefore represent an actual or proposed model state. For purposes of this application, these variations are collectively referred to as "What if?" scenarios. This is accomplished by the steps including: 1) storing data using a normalized hierarchical storage structure, 2) providing data address indirection means to access data available from a multitude of data sources, and 3) providing an object model to leverage programmable support to the orthogonal data views.

And further, through a GIS client, or other appropriate software client, an end user of the application can readily view a scenario of the model and does not need to directly access the database to insert, edit or find data to use in the model. In addition, the end user need not convert data from storage units, but instead the software of the present invention provides for an application unit, a working unit and a storage unit to be designated via the object model and the GIS client user interface. These programs also perform unit conversion, transparent to the end user.

BRIEF DESCRIPTION OF THE DRAWINGS

FIG. 7 illustrates a user interface presentation of physical alternatives in an alternative editor in accordance with the present invention;

FIG. 11 illustrates a user interface for the unit editor using which the user can determine the units for the model in accordance with the invention;

DETAILED DESCRIPTION OF AN ILLUSTRATIVE EMBODIMENT

The hierarchical organization of data in the database structure of the present invention is described first. Thereafter, an object model and GIS client for interfacing with the database to manipulate the data will be described. And further, for purposes of description, an engineering model of a water distribution network is described as an illustrative embodiment of the invention. It should be understood, however, that there are many other types of engineering models used in the civil engineering environment, and other applications, with which the present invention may be readily employed.

Figure 1A:
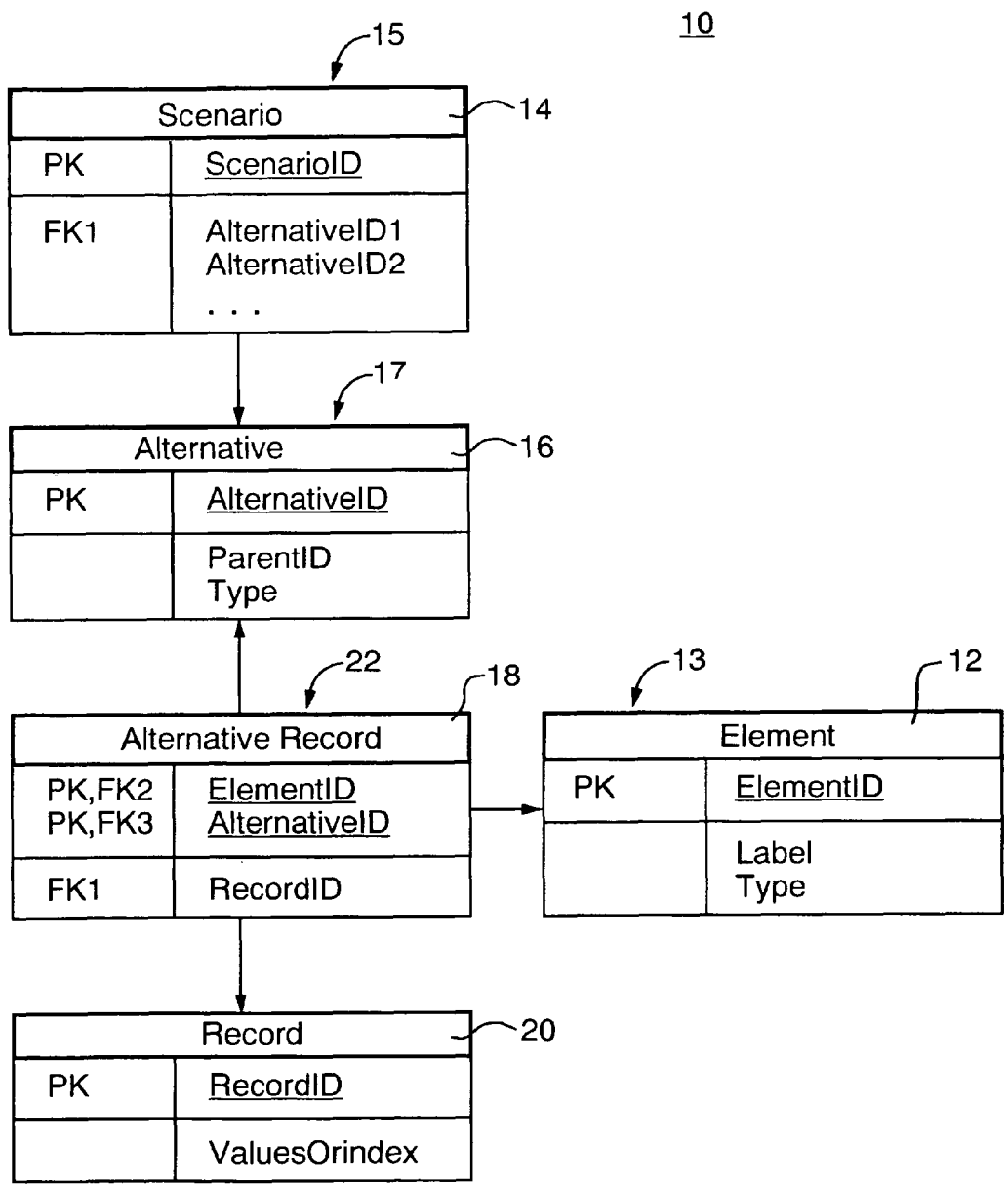
FIG. 1A illustrates an hierarchical data storage model in accordance with the present invention.

As illustrated in FIG. 1A, in accordance with the present invention, data is organized in a hierarchical data structure 10 using the following four basic data abstractions: element 12, scenario 14, alternative 16, and alternative record 18 as shown in FIG. 1A.

Element 12 is a primary unit (having a primary key PK) of an engineering system being modeled. The primary key associated with the element is a field in the database that uniquely identifies that record, as will be understood by those skilled in the art. In the water distribution network example, an element 12 may be, for example, a single pipe out of a multitude of pipes in the water distribution network. Or, it may be a pump, a valve, a storage tank or a junction. In another system an element may be a node on a power grid out of a multitude of nodes in a power distribution system. A hierarchical collection of such elements 12 may be stored in an element table 13, defining the engineering system being modeled.

Once such a system model has been defined, a particular scenario 14 featuring unique characteristics may be selected for evaluation. In the water distribution example, a scenario may include "What If?" combinations that give rise to a representation of "complete" data content for a particular, modeled engineering system "whole", such as water from a water source being pumped or routed over a particular branched-piping architecture to satisfy a particular water usage demand. Differing alternatives 16, or facets, such as pipe sizes, may then be selected to test the effects of different modeling variables, on the defined system model. As used herein, the term "facet" includes a single orthogonal dimension of a modeling problem that defines a set of related model parameters. An example of a facet is physical properties of model elements or loads applied to the model. An "alternative" as used herein includes a data set containing modeling parameters for a single facet. An example of an alternative is Summer Water Demand data for a Load Facet (as discussed in further detail herein). As used herein, a "scenario" is a complete data set that defines a single instance of a model. A scenario contains one alternative for each facet that defines the modeling problem. An example of a scenario is Current System Conditions with Summer Water Demands.

Associated with each element 12 in the system are a multitude of facet data that are generally stored in one or more records 20 in the data structure 10 or in a table and are selectively included in a model depending on a particular scenario 14 and alternative 16 being evaluated. For example, the physical properties of the aforementioned pipe could include pipe diameter, length, composition material, friction characteristics, temperature dependencies, etc., and a first alternative 16 might include a particular six inch pipe element 12 while a second alternative 16 might include a four inch pipe element 12 at that location.

As described in further detail herein, preferably, in a fully normalized database structure, such facet data are associatively linked to the particular element 12. In accordance with one aspect of the invention, this association is by an alternative data record 20 contained in an alternative record table 22. Thus, in the water distribution model, a first alternative data record includes the pipe "P-1" having a six-inch diameter, and a second alternative data record is the pipe "P-1" having a four-inch diameter. An alternative record table 22 provides a mapping, or linking, between elements 12 and data locations in a multitude of database tables associated with a particular alternative 16. A number of alternatives may reference the same pipe, for example, and in accordance with the invention, those alternatives refer back to the single record in the database for that pipe element. The database tables may contain actual data or contain further links to other data tables. Such a hierarchical organization allows a user to vary application conditions in "What If?" scenarios without locally duplicating data that is contained in remote database modules.

Such data records 20 may vary from scenario to scenario and between alternatives 16 of a particular scenario. Depending on the type of the element 12, the data contained within its associated alternatives may vary with other conditions, such as environmental changes and operating conditions. Commonly, environmental changes will cause changes in a subset alternative data 18 for the particular element 12, i.e. the alternative data 18 for a single alternative 16.

For example, the water consumption (base demand and daily demand variation patterns) will change between summer and winter while physical properties of a pipe (e.g., diameter and length) will not. On the other hand, during system rehabilitation physical properties of the pipe would change while demand data would stay the same.

A scenario 14 defines a predetermined selection of alternative data to be associated with the elements 12 included in an application being modeled. In other words, the scenario 14 aggregates a set of alternatives 16, which are orthogonal sets (facets) of alternative data 18 that define a single aspect of the problem addressed by an engineering application. Each alternative 16 references a set of alternative data 18 for each element 12 in the system and represents the data for a single modeling facet.

Figure 1B:
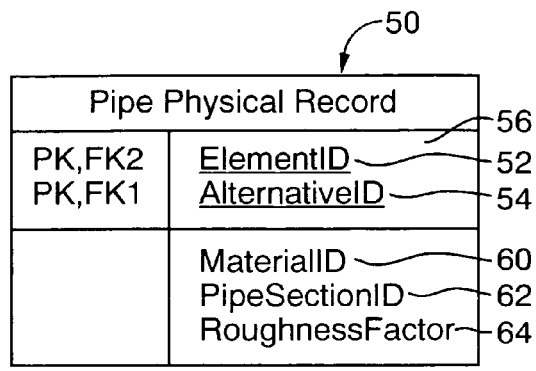
FIG. 1B illustrates one record of a hierarchical data storage model in an exemplary embodiment of the invention involving a water distribution network modeling system.

For example, as shown in FIG. 1B, a physical pipe record 50 includes an element ID 52, which identifies a particular element, such as the pipe "P-1". An alternative having an Alternative ID 54 identifies the alternative to which the records relate. For that element, which may be the pipe "P-1", and that particular alternative, the set of information describing the pipe element "P-1" is stored as a valid entry in the memory location 56. The memory location may include data about the material 60 of which the pipe (in this alternative) is constructed, such as ductile iron. Similarly, a pipe section entry 62 may include information about pipe diameter or the type of pipe section, and the roughness factor is given in entry 64. The record 50 includes the information for the alternative 54. Then, each scenario 14 (FIG. 1A) aggregates exactly one alternative 16 of each type (for each modeling facet) in order to be a valid scenario.

Figure 2A:
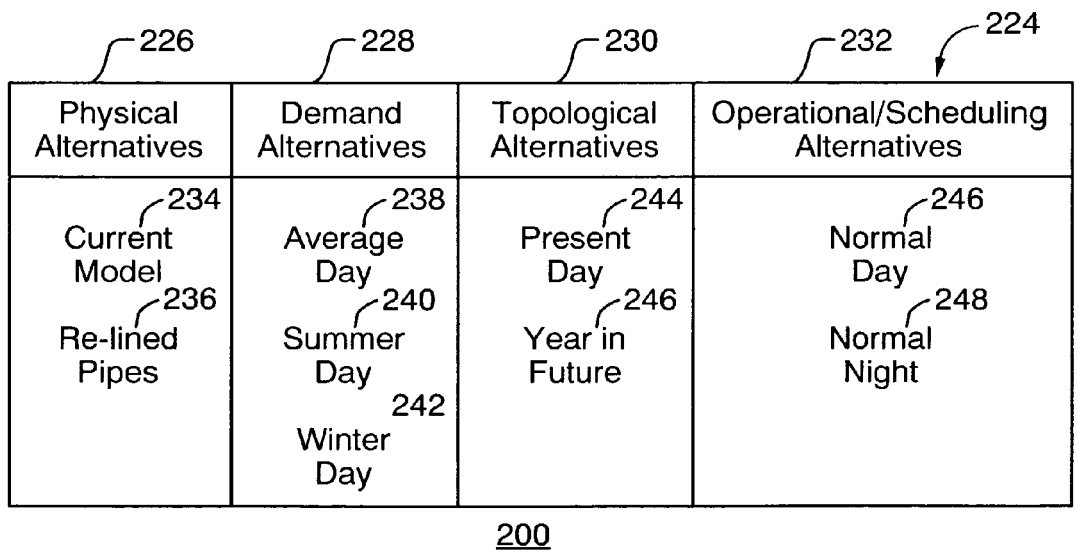
FIG. 2A is a table of alternatives that comprise specific "What If?" scenarios for a water distribution application in accordance with the invention.

All of this information can then be categorized in a non-limiting exemplary hierarchical data storage model 200, as illustrated in FIG. 2A. According to one embodiment of the present invention, water distribution model 200, includes a table 224, that consists of four facets: Physical Alternatives 226 (i.e. properties) pipe diameters of each pipe, of the included elements, Water Demand Alternatives 228, Topological Alternatives 230 (i.e. element connectivity), and Operation Scheduling Alternatives 232. Other alternatives may be included while remaining within the scope of the present invention.

In FIG. 2A, the Physical Properties facet 226 has two alternatives: Current Model 234 representing the current conditions of pipe elements in the system and "Relined Pipes" 236 representing condition with pipes relined to reduce friction. "Water Demand" facet 228 has three alternatives: "Average Day" demand 238, "Summer Day" demand 240, and "Winter Day" demand 242. Topological alternatives are represented in FIG. 2A by a current system ("Present Day" 244) and a futuristic one possibly with additional elements to represent new developments in the system ("Year in Future", i.e., 2010 246). Operation Scheduling facet 232 has two alternatives: "Normal Day" operations 246 and "Normal Night" operations 248.

Figure 2B:
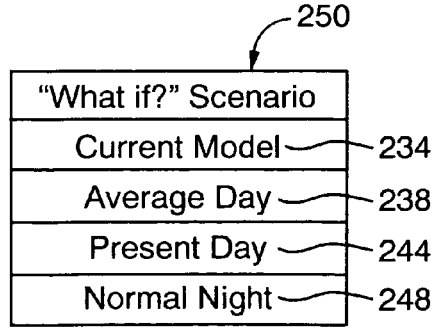
FIG. 2B is one exemplary scenario constructed in accordance with the present invention.

Drawing on the data in the storage device for each of these alternatives, one can construct a scenario. An example of a valid scenario is illustrated in FIG. 2B as scenario 250. It is a scenario with "Current Model" 234 physical properties, "Average Day" demand 238, "Present Day" 244 topology, and "Normal Night" operations 248 schedule. Other permutations of the alternatives will give rise to different scenarios in accordance with the invention.

A specific scenario 14, such as that identified in table 250, of FIG. 2B, does not contain any data; but rather identifies (via foreign key associations, FK1, FK2) which alternatives 16 (FIG. 1A) are used. For example, the scenario 250 of FIG. 2B, may have as its physical alternative, "Current Model" 234. In "Current Model" 234, there may be a pipe element P-1, such as the element 52 (FIG. 1B) having a primary key association PK and a foreign key association FK2. As discussed in further detail herein, the primary key association uniquely identifies the element. The foreign key association identifies the association in a different table in which the alternative may be stored or instructions regarding its location are provided. The actual data is stored in alternative data tables, which are referenced by the alternatives 16 and elements 12 through alternative data records 20 contained in the alternative record table 22 (See FIG. 1A).

In summary, as shown in FIG. 2A, an example of a collection of alternatives, which comprises a specific "What If?" scenario is a combination of properties or characteristics appropriate to the particular application. As can be seen, in a scenario, a predetermined set of alternatives is selected for inclusion and evaluation. As the particular alternative is included in the application, a specific selection of associated data is also incorporated into the application. For example, in a water distribution modeling application, Physical Properties (Physical Alternatives 226) of elements or data about Water Demands (Water Demand Alternatives 228) would form an alternative. Each alternative contains an alternative record for each element in the system. This alternative record references a data record that contains the actual data. The data for each alternative is stored in data records. An alternative data record 20 corresponds to an element-alternative pair that points to an appropriate data record. (FIG. 1A) A single data record may be shared between multiple alternative data records 20, meaning that several alternatives may include the same pipe element and each of those alternatives reference and use the same, single record for that pipe, which allows sharing of data between alternatives, and thus scenarios, without data duplication.

Moreover, this data is shared between the alternatives by using "inheritance trees." An alternative may be a base (root) alternative or it can be an inherited alternative, whereby it inherits its data from a parent alternative. An inherited alternative can share data records with its ancestor (i.e. parent) alternatives.

Data record sharing allows multiple alternatives to have the same data for some elements while the data for other elements may be different, so in one example, one set of pipes may be current ductile iron, and another set may be selected as re-lined in order for the design engineer to analyze whether re-lining the pipes along one street, for example, may benefit the overall system. Data changes made to a specific scenario becomes "local data" to that scenario. Such data changes do not propagate upward to a parent scenario, nor do subsequent changes in a parent scenario override the modified local data. For example, an inherited physical property alternative in a water distribution model could change pipe diameter for a single pipe. Physical properties data records for all other pipes would be shared between the parent and child alternative.

Figure 3A:
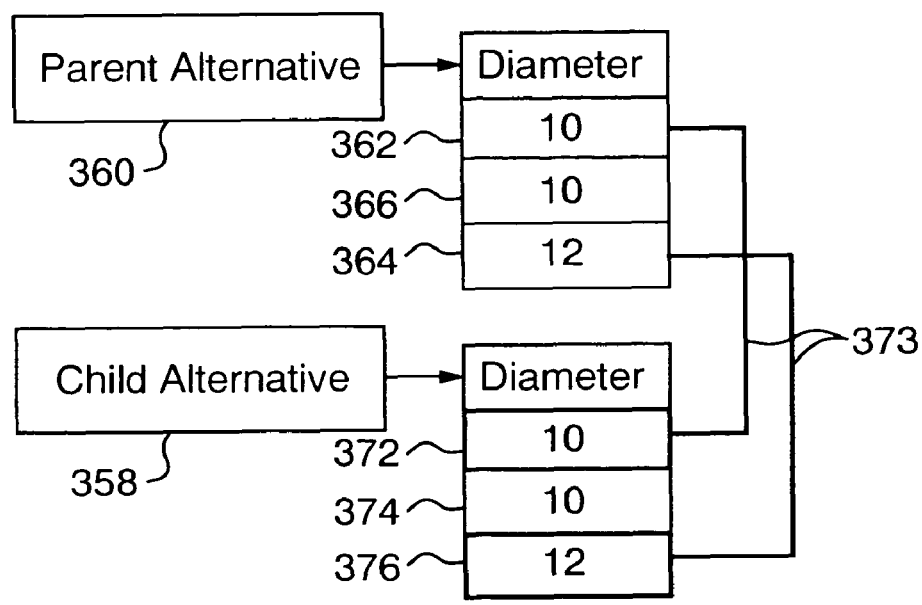
FIGS. 3A and 3B illustrate an example of alternative inheritance in accordance with the invention.
Figure 3B:
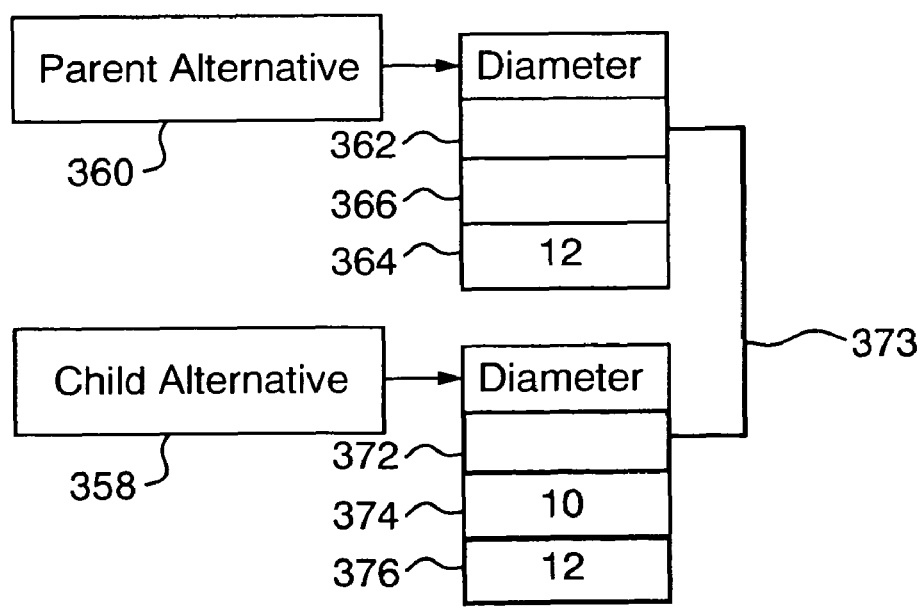

FIGS. 3A and 3B illustrate an example of alternative inheritance. In FIG. 3A, a record 360 has been determined to be a parent record. A child alternative 358 inherits its information from the parent alternative 360. For example, assume that the records are pipe element physical property records, and that the diameter for first and last elements, 362 and 364, respectively, in the alternatives 358 and 360 are common and are "shared" between the parent and child alternative, 360 and 358, respectively. Assume also that a diameter for a middle element 366 has been redefined as being local to the child alternative 358, although at this moment it may be still identical to the parent. At a later time, as shown in FIG. 3B, the parent alternative 360 is changed to replace 10-inch diameter pipes 362, 366 in FIG. 3A with 8-inch diameter pipes. This change is thus also made in child alternative 358 for the first pipe 372, which inherits its data from parent alternative 360, as illustrated by the line 373. However, since the second entry in the child alternative table has been designated as Local, it is not overwritten with new data when the parent record is edited. In the figure, the relevant memory locations are shown as blank to illustrate that the data there is erased, or overwritten with the new alternative diameter. With respect to the pipe element 374 of child alternative 358 this has been previously defined as local, and will not inherit and thus does not change when the parent is edited, and it thus remains as 10, since this data is local to child alternative 358, and as such is not updated or edited when a parent record is updated. In accordance with one aspect of the invention, to determine if a record is local, the application compares its ID with its parent's ID. If the record's ID is equivalent to the parents ID, then the record is inherited. Otherwise, if there is not a parent or if the parent ID is different, then the record is local.

The designation of parent and child records, and whether a record is local is made when the database is initially constructed, or when a new entity is added (as discussed in further detail hereinafter). More specifically, after selection of the elements 12 comprising an engineering system to be modeled, the design of a database begins at the scenario level with the creation of a Scenario table 15. (See FIG. 1A). Scenario table 15 contains the scenario key (Scenario ID) and a list of references to corresponding alternatives 16 (i.e. AlternativeID1, AlternativeID2, etc.) There must be exactly one reference for each type of alternative 16 (each facet).

An alternative table 17 contains references to each defined alternative 16 as well as its parent reference and alternative type (facet). A parent reference for a base (root) alternative is set to null. Each entity in Alternative table 17 has unique key (Alternative ID). Alternative keys are used in scenario table 15 to identify alternatives 16.

The Element table 13 defines the multitude of elements 12 used in the model. Entities in this table identify a type for every element 12 that is in the model and along with its label. The actual data for each element is held in alternative data table referenced by the alternative data records 20 for the element 12.

Associations between elements and alternatives are stored in alternative record table 22. Each alternative data record 20 contains a reference to a specific element 12 in the element table 13. Thus, there is no need to duplicate this data for different scenarios, the record for that element is accessed when needed. The alternative data record 20 also contains an alternative reference from the alternatives table 17, (an FK for the alternative) and a record identifier that points to specific data in the alternative data table that is associated with that element 12 for that alternative 16. Using the method of the present invention that includes introducing this level of indirection between alternatives 16 and elements 12 and in the alternative data records 20, the method of the invention prevents duplicate storage of data, both across alternatives 16 and scenarios 14, thus preserving data consistency (FIG. 1A).

As previously discussed, a particular alternative data table may contain the actual data being referenced, or depending upon the complexity of the data being referenced, a relationship key to some other table or tables.

Figure 4:
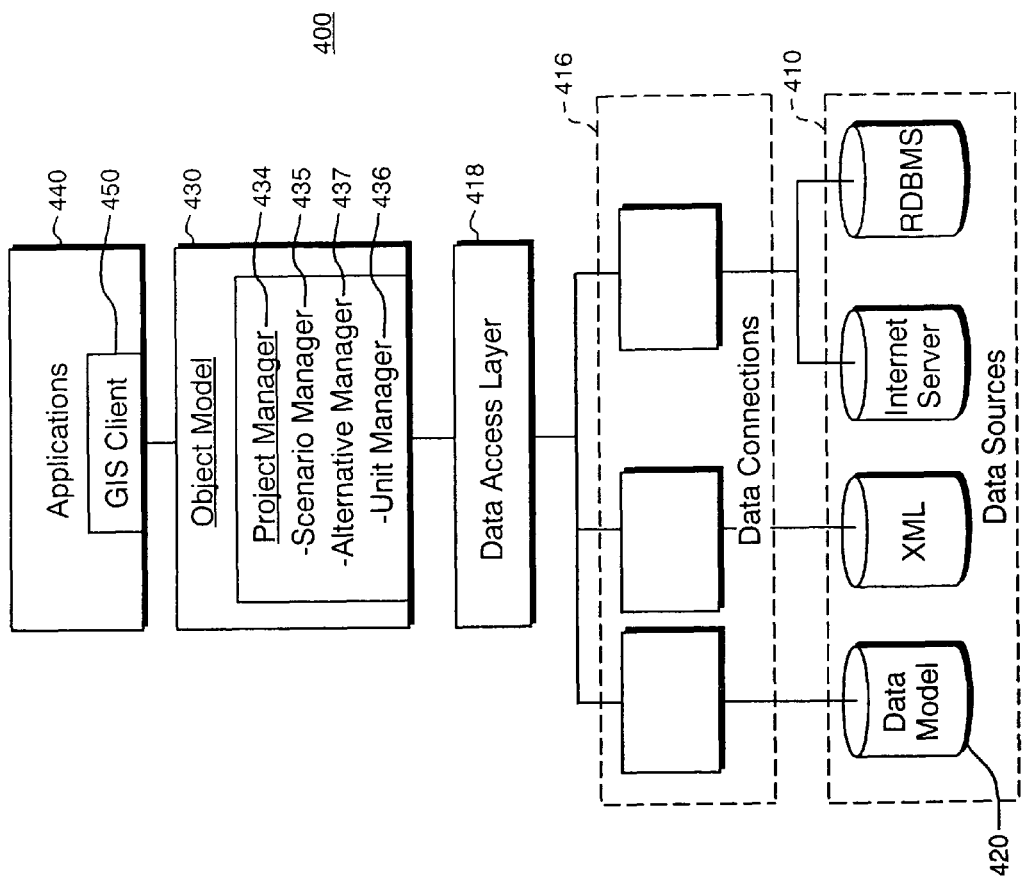
FIG. 4 is a schematic block diagram of the hierarchical data modeling system of the present invention.

The database designed using the method of the present invention, is accessed by an object model and a GIS client that allows a programmer, and an end user, to readily manipulate the data without having to know how to access it directly. Architecture for the data storage system 400 of the present invention is illustrated in FIG. 4. The system 400 includes the database 410 just described which includes alternative tables, records and elements, 420. An object model 430, which may be a COM (Component Object Model) based object model, is used for programmatic access to the data. However, other object models can be readily employed while remaining within the scope of the present invention. Such an object model 430 is an expression of the hierarchical data storage raw state as orthogonal modeling attribute collection. A data connections layer 416 and a data access layer 418 interface between the database and the object model. By exposing the data through an object model, a level of separation between the actual data store and the application is achieved which allows for the use of diverse data storage mechanisms and/or OEM databases from different providers.

The object model 430 contains modules for programmers to use to manage the engineering model data. More specifically, a project manager 434 is an object that allows for a number of functions to be performed. It includes, as in the illustrative embodiment, a scenario manager 435, that provides the programmer access to the scenario, alternative and element data stored in the database 410, that was just described.

The system 400 of the present invention also includes a unit manager 436, which is part of the project manager 434. The unit manager 436 is an object that is used to perform unit mapping between data stored in the database. As discussed in further detail herein, data may be stored in one type of unit, such as Imperial units, while the programmer's data is in International (SI) units. Using the unit manager of the present invention, the programmer can work with units of one convention, while the end user works with units of a different convention without having to perform conversions.

More specifically, unit transformation is achieved using the unit manager 436, which stores mapping information linking the associated storage units and working units for each attribute, which is defined for each data type in the system. For example, an attribute in a water distribution modeling system may comprise a length dimension of a pipe. This is defined as an alternative in the same manner as the other alternatives previously discussed herein, and it is keyed to an element, or element type, as if it were another feature, such as diameter. Thus, when an element record is called up, it can have a unit associated with it, or alternatively, there may be a number of equivalent values, based upon different units of measurement and the desired one may be selected.

Furthermore, unit transformation allows different units for attributes that may use the same dimension. For example, a pipe length may be measured in feet, while pipe diameters can be measured in inches, although both attributes belong to the same dimension of length.

In other words, the unit manager 436 provides the linking or mapping between user-defined measuring units characterizing the input data and the working units that may be required by the application. The mapping between storage units and working units may be done implicitly by the system, and thus it is transparent to the both the user and the remote database, and this is discussed in further detail herein.

The object model 430 of the present invention also provides a mechanism for handling reference updates on insertions, edits, and deletes of elements. While the user manipulates element data for a particular scenario using selected working units, the object model 430 provides unit mapping and resolves data record references within alternative inheritance trees.

Figure 5:
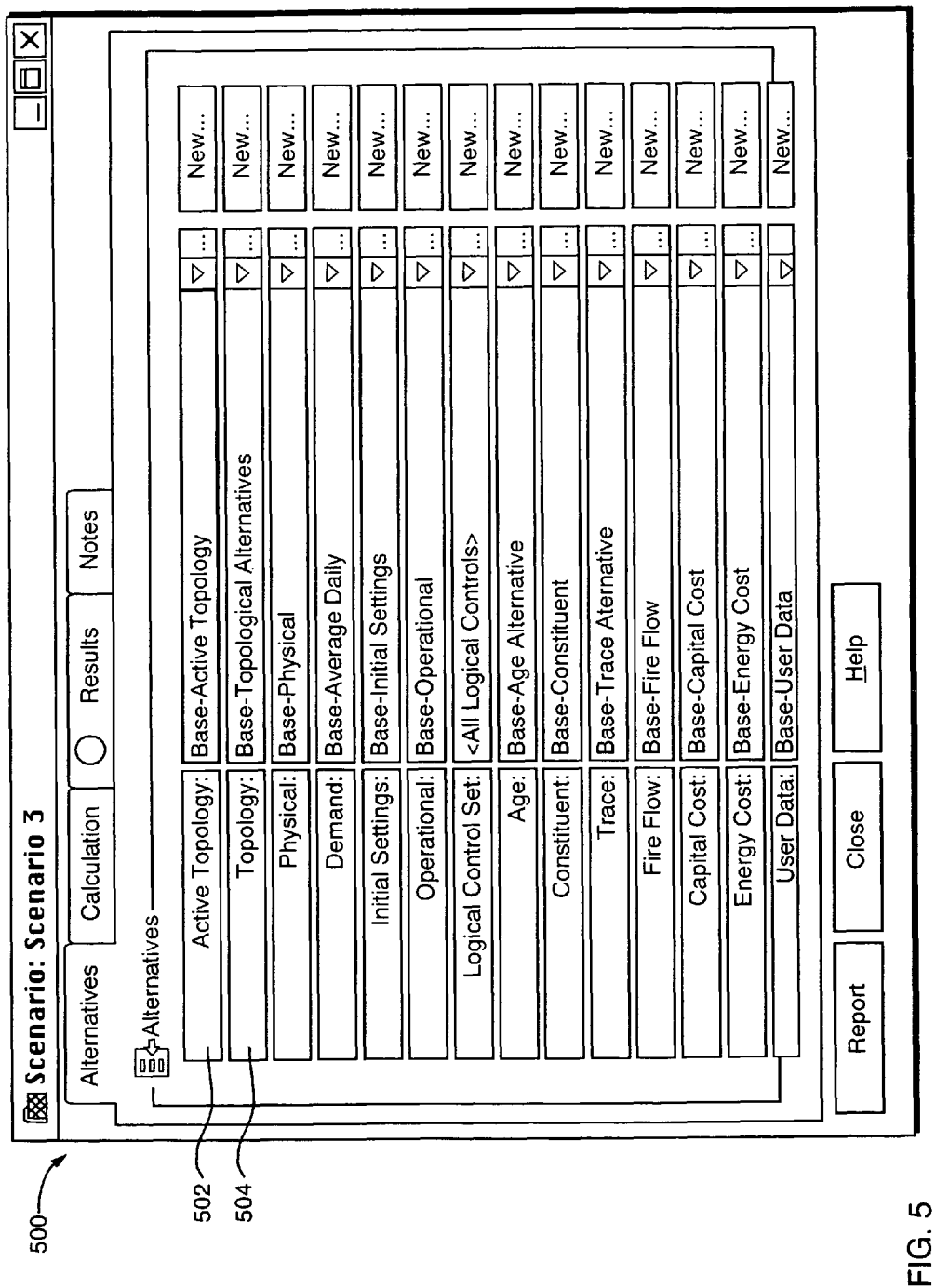
FIG. 5 shows a preferred user interface for constructing a scenario in accordance with the present invention.

The user, however, does not need to know how the data is stored to access these records directly from the database. Instead, the user is presented with a readily understandable graphic user interface (GUI) 500, as illustrated in FIG. 5. Using this interface, scenarios may be constructed by the scenario manager when the user selects from the choices provided in the windows 502, 504 and so on.

As illustrated in FIG. 5, the user is offered a list of available alternatives for each facet. The object model preferably provides alternative lists for a given alternative type in order to allow the user to select an alternative having a valid type for each facet. The object model ensures that there is always at least one alternative for each facet. To achieve this, the object model will create one alternative for each type at the time a new model is created. The object model then preferably prevents the deletion of the last alternative of each type. The object model that manages scenarios and provides interfaces for scenario creation, editing, and deletion is called Scenario Manager. Scenario Manager keeps track of the currently active scenario and preferably provides interfaces for changing the active scenario working-context. This scenario is used to process data requests by the user. The object model 430 (FIG. 4) maps user data edits to the alternatives in the currently active scenario.

The object model 430 (FIG. 4) also manages alternatives for each facet. The object model tracks the links and alternative related to the storage of the alternative data. For example, the object model may map a user request to edit a pipe diameter into a request for editing of the physical properties record for a particular pipe element in a current physical properties alternative.

Figure 6:
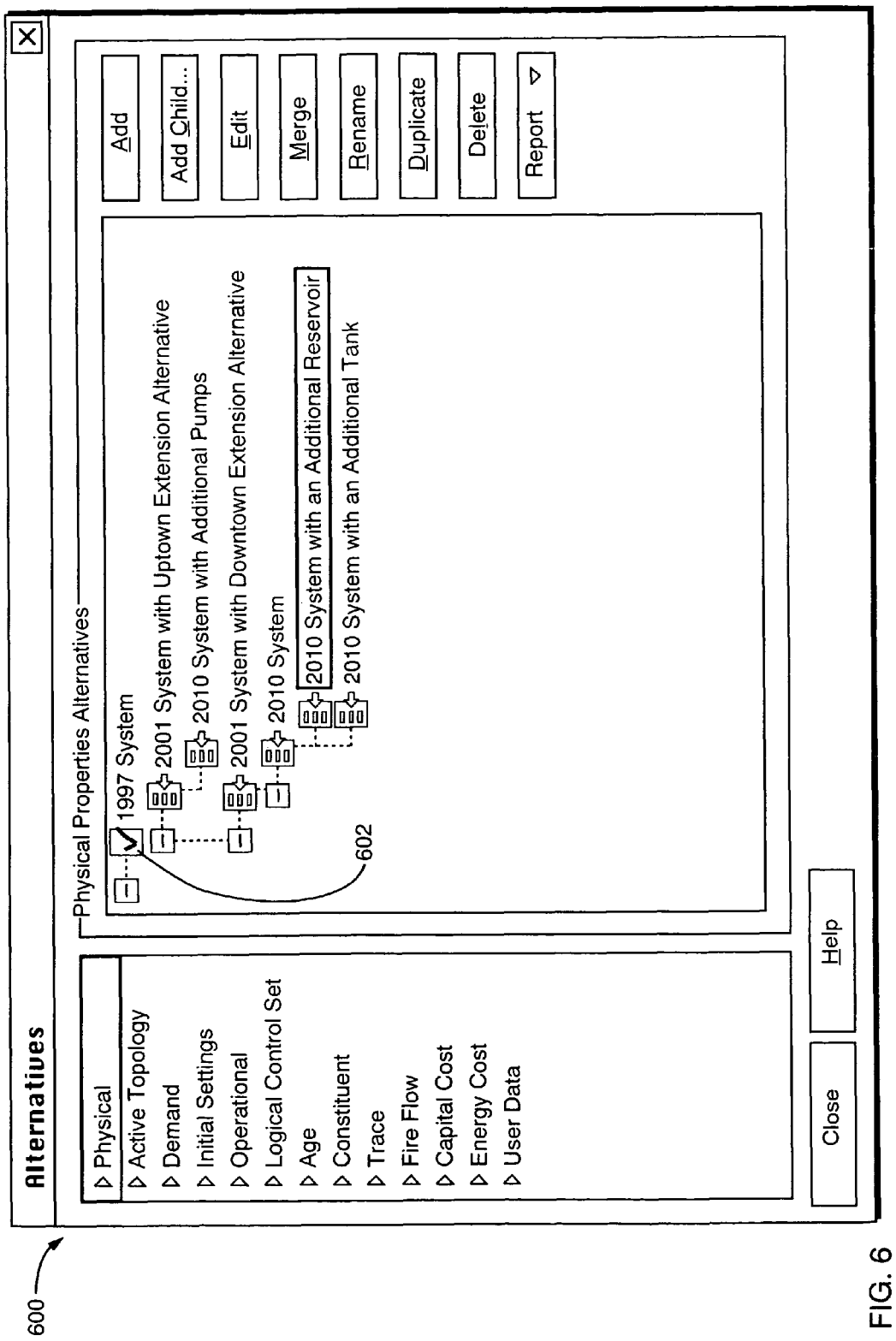
FIG. 6 illustrates a user interface presentation of an alternative manager in accordance with the present invention.

The GUI 600 of FIG. 6 allows the user to select alternatives that the object model 430 (FIG. 4) exposes. This allows the user to study and analyze the model using the alternatives selected. More specifically, alternatives are managed through alternative manager objects. Each alternative type has a manager associated with it. The alternative manager object preferably provides interfaces to insert, edit, and delete an alternative. The data for an alternative may be edited either directly within an alternative or through element editors. FIG. 7 illustrates an example of an alternative editor. In this example, the GUI for inherited Physical Properties alternative allows edits for physical properties of a water distribution model pipes. Using the alternative editor, accessed by the GUI 700 of FIG. 7 the user can edit data for all existing elements. A check box 702 through 718 preferably allows the user to decide whether an inherited alternative data is local or is shared with a parent alternative.

For a base (root) alternative these check boxes are preferably always checked "ON." In this example, a GUI base alternative is indicated by colored check box. A color (not shown) may be used to indicate that the user cannot change the state of the check box. If the check box is white and checked, that may indicate that the alternative data belongs to an inherited alternative and that the user has previously selected that it should be Local. Local inherited alternative data are preferably stored separately from parent's alternative data. If this box is unchecked it may indicate that this alternative data is inherited and shared with its parent. Control data associated with such a check box may be used to determine which alternative data, local or inherited, gets edited on an edit action, the local data record for the inherited alternative or the shared parent record.

Finally, the user may edit data directly through elements. Once element data is edited, the object model maps the changes to alternative data that correspond to the edited element and current alternative. The current alternative is the alternative of the type of the data being edited in the current scenario. The object model keeps the track of the current scenario. The user is preferably allowed to change the current scenario.

Preferably, the object model also allows the user to edit multiple elements at the same time. For example, the user may choose to change diameters for a selected group of pipes. The object model will map this action to corresponding editing actions for each selected element using the current alternative. Similarly, the object model also handles creation and deletion of elements. It validates requests and passes them to the data access layer. And further, FIG. 7 illustrates a user interface 700 allowing for selection of alternatives. For example, one pipe diameter (an alternative) for each of pipes P-1 702 through P-9 718 is set forth in the table. Under other scenarios, the pipe elements may have a different diameter or may be constructed of a different material, and these may be used in constructing a different model for analysis and comparison.

As will be understood by those skilled in the art, the system of the present invention provides a tool for the design and editing of scenarios and alternatives for an engineering model. "What if" scenarios can be easily managed, executed through a domain specific mathematical model, and the data and results can easily be compared and contrasted without any data duplication, thus ensuring quality assurance of data entry and changes, with minimal errors.

In order that the data is even more readily accessible to the end user and in that format desired by that end user, an integration wizard interface is provided. A GIS client 452 provides views for a single scenario in the model. The GIS client 452 uses the object model 430 to interface with the database of the present invention. Using the object model 430 services, the GIS client 452 does not need to keep account of alternatives, data inheritance, unit conversion, and the like. The object model 430 resolves requests for the data attributes (parameters of modeling elements, e.g., pipe diameter) to appropriate alternatives (e.g., physical properties in the case of pipe diameter) and corresponding alternative records (accounting for inheritance, if applicable).

Figure 8:
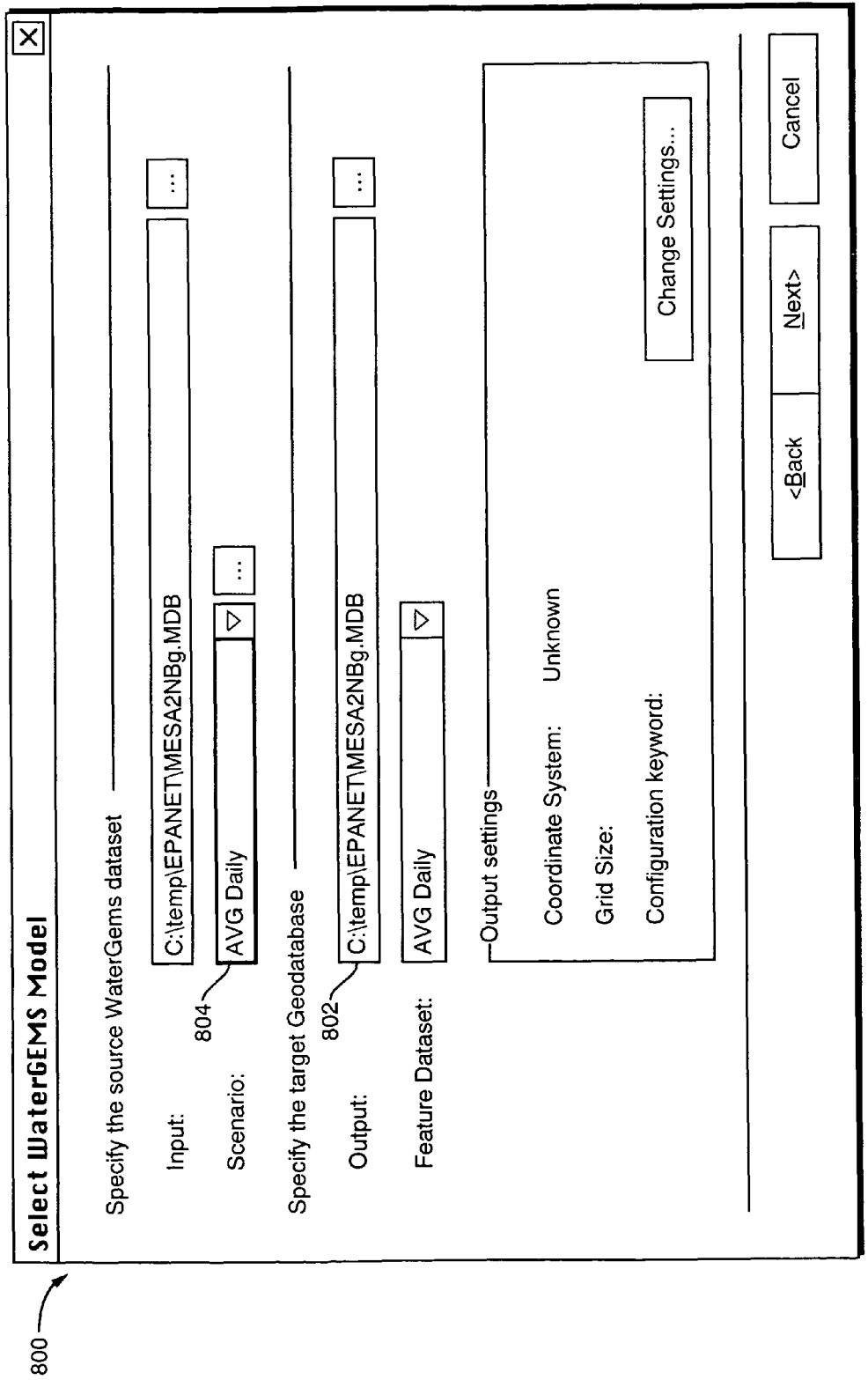
FIG. 8 illustrates a user interface wizard for connecting a GIS database with the object model of the present invention.

As illustrated in FIG. 8, the GUI 800 allows the user to connect a geographic information system ("GIS") application using a GIS database 802, whether it is a new one or an existing one, with a single scenario 804. In the example, the GIS database is an EPANET GIS database that is public domain software that has been adopted for use in the industry and which is made freely available by the U.S. Environmental Protection Agency, of Washington D.C. There are many other GIS programs available to those skilled in the art, and the invention is readily adaptable for use with other such programs.

Figure 9:
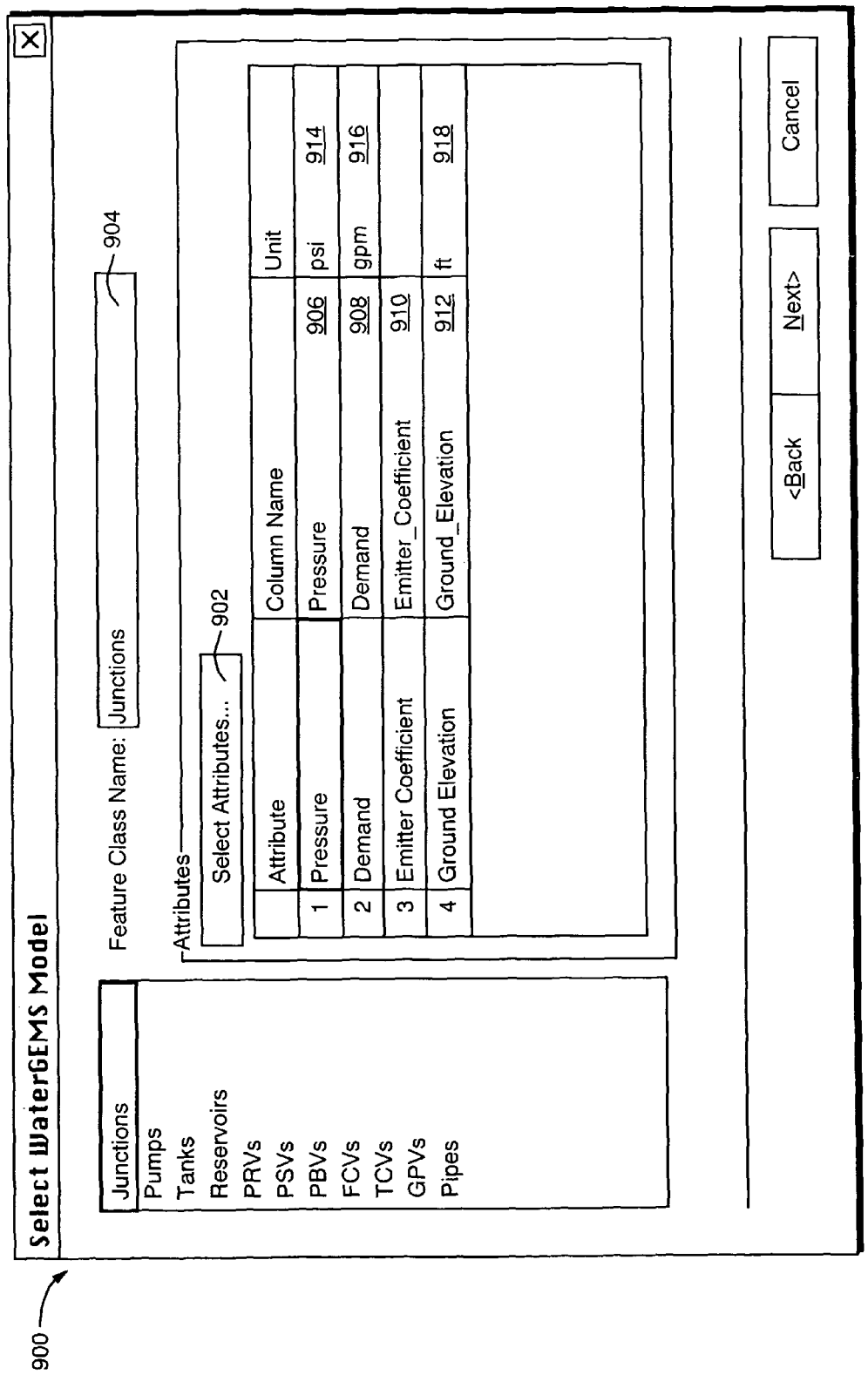
FIG. 9 illustrates a user interface wizard for selecting attributes to be exposed for a selected model element in accordance with the present invention.
Figure 10:
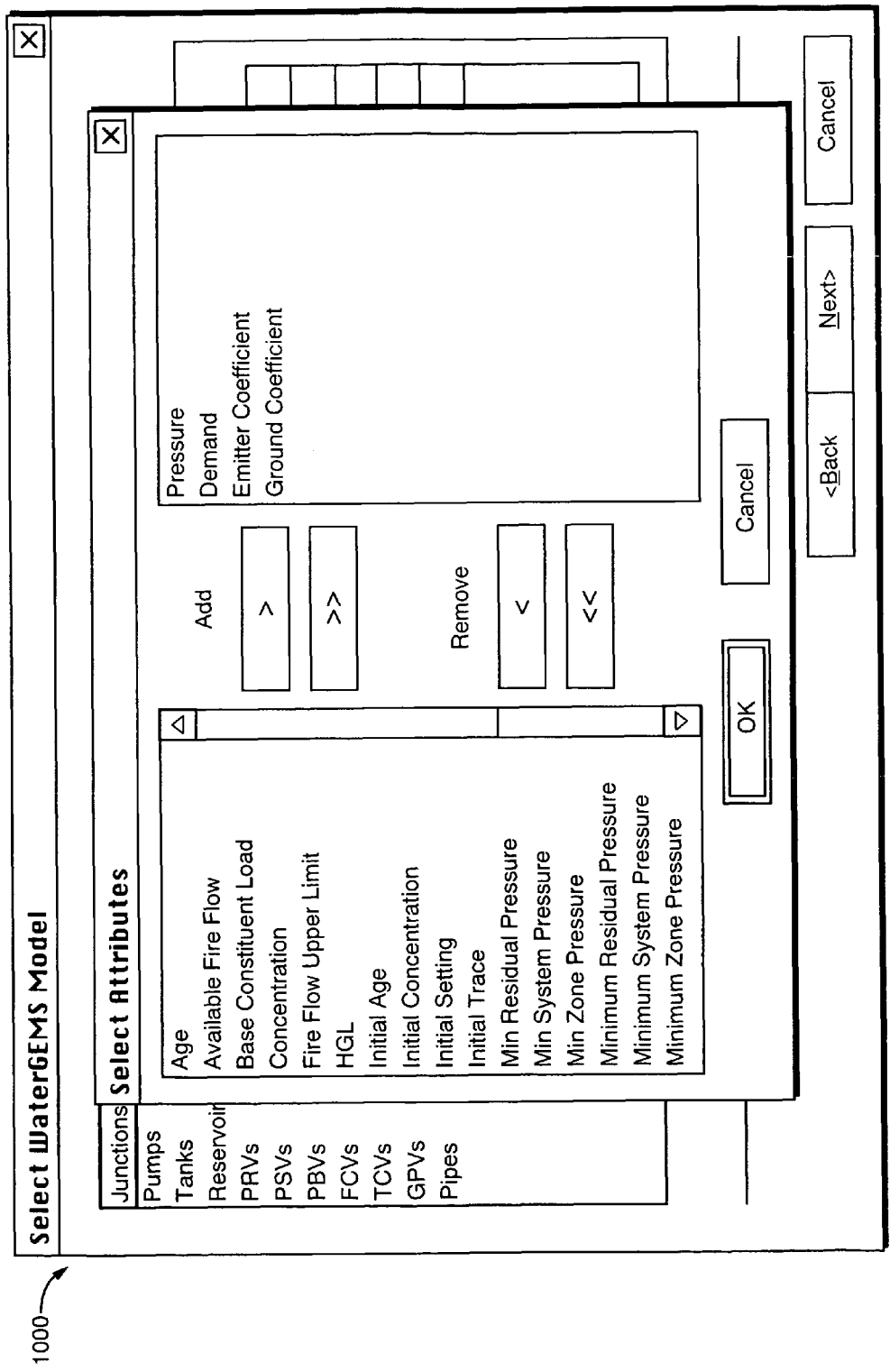
FIG. 10 illustrates a user interface wizard for adding and removing attributes from a list in accordance with one embodiment of the present invention.

After the scenario is selected in the step illustrated in the screen shot of FIG. 8, the GIS user then selects, in the next step shown in FIG. 9, a set of attributes 902 that will be exposed in GIS for each modeling element. In the example of FIG. 9, the modeling elements are junctions as shown in the window 904. In the example, pressure at each junction 906, demand at each junction 908, emitter coefficient 910 and the ground elevation 912 at each junction have been selected as attributes. In accordance with the invention, the user may also select the units, 914 through 918 that the user would like to see as the display unit for each attribute. The attributes are selected from the list 1002 displayed in GUI 1000 of FIG. 10.

Moreover, the unit management feature of the present invention provides for the automatic unitization of data by mapping working units to storage units for all attributes. Working units represent the units by which a user desires to view the data, and storage units represents the units used during storage of the data in the database. A more detailed GUI for this aspect of the invention is illustrated in FIG. 11. For example, an application may use pipe lengths dimensioned in miles, while the database may store pipe lengths in meters. When the application requests pipe length for an individual element, the unit manager 436 (FIG. 4) of the object model 430 will automatically convert the data value obtained from the database from meters to miles and provide the mile value to the application. A similar procedure is preferably used during editing. When the user edits pipe length in miles the unit manager 436 of the object model 430 will convert this data value to meters before storing it to the database.

During data access operations, the user can either pass a value without units to the object model 430, in which case the object model 430 preferably assumes that the units to be equal to the current working units. Alternatively, the application may specify the units directly for each transaction, with the units being identified using symbols that are published by the object model. Thus, the applicant can ask the object model for available pipe length units.

For each attribute in the application, the user may select the units to use. The user may also select unit systems that will automatically reset all units to default units for that system, which allows for an easy change between metric (International System—SI) units and standard (imperial) units. The object model stores both working and storage units for each attribute. The mapping between unit systems may be implemented using conversion coefficients, which for the preferred embodiment of the invention, are stored in XML format in the database. The user can extend unit conversion system with new dimensions, attributes, and units.

Figure 12:
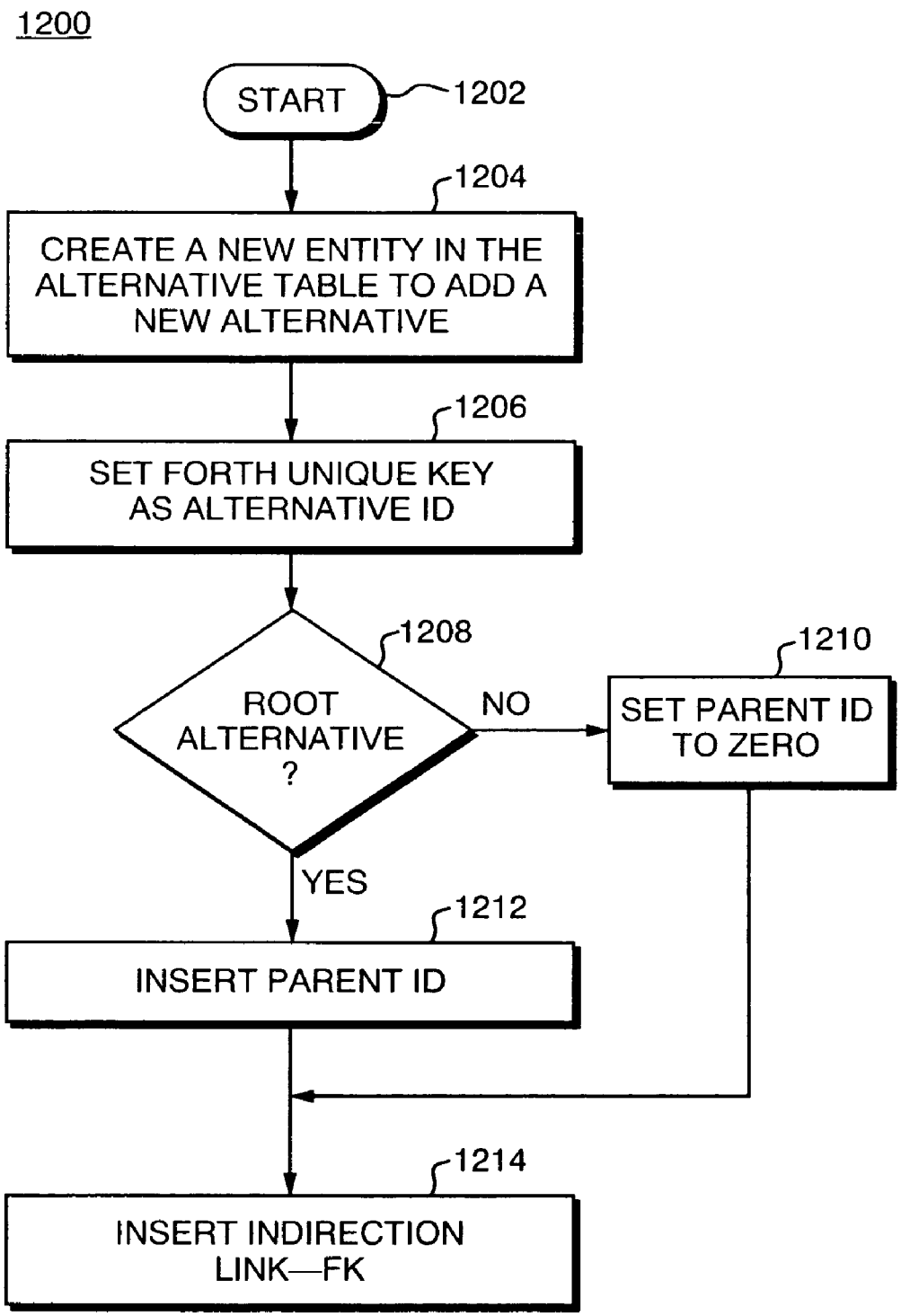
FIG. 12 is a flow chart of a procedure for adding a new alternative in accordance with the present invention.

In accordance with the method of the present invention, a procedure is illustrated in FIG. 12. By way of background, the data access layer 418 (FIG. 4) is the lowest layer of the invention presented here. It defines a preferred data model, the way facet data is stored in a database, and how this data is to be manipulated. The data access layer 418 communicates with the database 410 and separates the object model 430 from the database implementation issues, which allows accurate modeling regardless of the organization of back-end storage databases. Specifically, a user does not need to know whether the database is a simple Access file stored on a local computer or a large database system distributed across a network, since the inner workings of databases are concealed within this layer. By changing this layer, the modeling application can change the backend storage system transparently to the user.

As described previously, the present invention defines engineering application models in terms of modeling elements and data facets associated with the elements, with the data for each facet being stored in alternative data records. Selection of scenarios and alternatives allows the user to easily evaluate "What If?" scenarios without data duplication.

From time to time, even after the data model has been designed, an engineer may want to introduce a new alternative into the system. To insert an alternative into the model, a user selects a type for the alternative to be inserted and whether the alternative will be base (root) or inherited alternative. For inherited alternatives the user needs to define a parent alternative. Using this information, the data access layer creates a new entity in Alternative table 17, as illustrated in FIG. 12 as step 1204.

The entity is constructed of a data string, which includes predetermined data portions for a uniquely generated data key (i.e. an Alternative ID) step 1206. If the inserted alternative is a base (root) alternative, step 1208, then a "parent ID" will be set to nil as illustrated in step 1210. Otherwise, the parent ID will be set to the alternative ID of the selected parent 1212. An indirection link to a data source is then inserted into the data, step 1214. An entity in the alternative record table is thus created for each element in the system. These entities will point to the newly created alternative using its Alternative ID and to each element in the system using an appropriate Element ID.

Alternative deletion is an inverse process to its creation (i.e. insertion). The user selects an alternative to be deleted. The data access layer will first verify that the alternative can be deleted. Specifically, an alternative may be deleted if is not referenced by any scenario and it does not share data with another (inherited) alternatives. An alternative that shares its data with other alternatives or is referenced by scenarios cannot be deleted until all children alternatives and scenario references are first deleted. If the alternative to be deleted is at the end of inheritance tree, i.e. an inheritance tree leaf it can be safely removed from the model. (A leaf is an alternative that does not have any children.) In the deletion operation, the system will first remove all data that is local to the alternative (i.e. the records that are not inherited from its parents.) The records that are local to an alternative are defined by the aforementioned "IsLocal" attribute in the Alternative Record table. The next step in deletion of an alternative is to delete all alternative records that point to this alternative for each element in the system. Finally, the alternative itself is deleted from the alternative table.

Although there are no special requirements for editing alternatives, alternate embodiments of the present invention may choose to modify data contained in the alternative, such as alternative label for example. Such editing does not influence the operation of this invention.

In accordance with the method of the present invention, the modeling application provides the user with point-and-click Graphic User Interface (GUI) to insert elements. Since no data is required at element insertion time, the element will be automatically assigned default (prototype) data by the system. The user is provided with an option for defining a label for the element.

Figure 13:
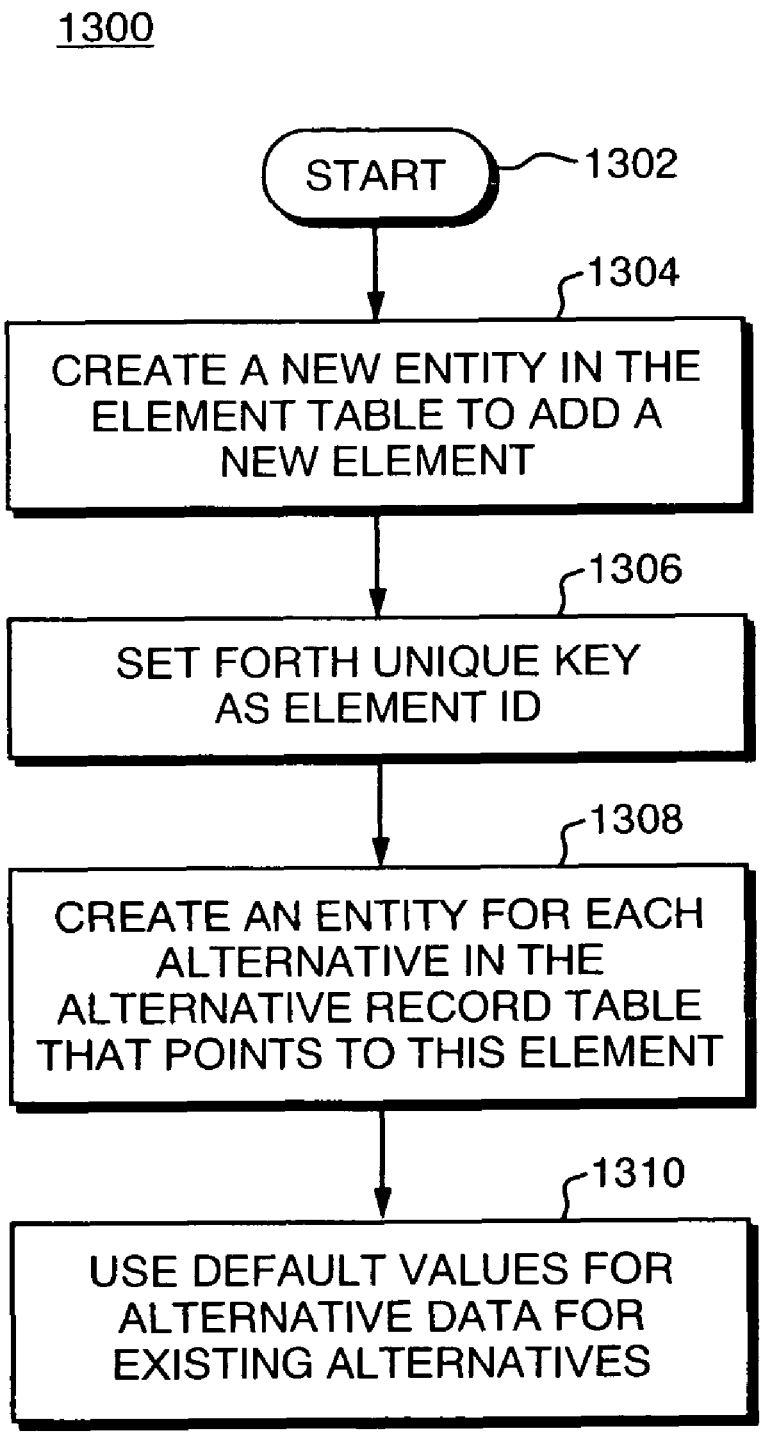
FIG. 13 is a flow chart of a procedure for adding a new element to the model in accordance with the present invention.

Once a selection is made, the data access layer first adds an entity to the Element table as illustrated in step 1304 of the procedure 1300 of FIG. 13. The element is assigned a unique ID at the time it is created, step 1306. An entity for each alternative in Alternative Record table is created, which points to this element, as shown in step 1308. If the alternative in question is inherited its record will be shared with the parent record. Alternative records are inserted iteratively through alternative tree from the root upward. This ensures that a parent alternative record will exist at the time of creation of an alternative record for the child alternative. For a base (root) alternative, a new entity is created in Alternative Data table for the inserted element. Alternative Data for the new element is created using default values as shown in step 1310, in order for the system to provide a modeling application a new element populated with default data for all existing alternatives.

Element deletion is allowed, however, in a particular modeling application, rules may be imposed for element deletion, such as, a water distribution system preventing the removal of pipes that will break network in two parts. The data access layer, however, typically does not require constraints on element deletion.

The user selects the element to be deleted, and the elements are preferably deleted in reverse order of the creation. First, local alternative data corresponding to the element is deleted from the Alternative Data table. Then alternative records corresponding to this element, both local and inherited ones are removed from Alternative record table. Finally, the element itself is removed from the Element table.

As in the case of alternatives, there is no data stored with an element except its label. The user is allowed to edit the label without restrictions, as this will not influence the operation of the system described here. The data for the modeling application is stored in the Alternative Data table.

To insert a new scenario a user preferably selects an alternative for each facet in the model. A scenario may be added to the system, as long all alternatives that are proposed are valid and existing. A valid alternative corresponds to the type of the facet for which it is selected. For example, in FIG. 2A, a Current Model Physical Properties alternative is a valid choice for physical properties facet but it is not a valid choice for Demand facet. The system will create a new entity in the scenario table and assign proper alternative ID to each facet type.

A scenario can be deleted, but the application system may impose constraints on scenario-deletion if desired (e.g., there should always be at last one scenario in the model) but the present invention does not require it. At scenario deletion, the entity corresponding to the deleted scenario is removed from scenario table.

A scenario may be edited. The user can change alternatives as long as the new alternative selected for that facet is valid and existing. The system will assign the new alternative ID to a changed facet type.

Preferably, the user cannot insert alternative data directly into the database. Alternative data is preferably inserted by the system at alternative or element creation time. Alternative data may also be inserted when a user decides that a particular alternative record in an inherited alternative is to be local. The new alternative data will preferably be initialized using the parent alternative data instead of default (prototype) data, in order to insure that inheritance will be preserved and the user will retain the ability to vary child record data independently of the parent alternative record. Base (root) alternative records are always local. Thus, they are never changed to nonexistent parent records.

Preferably, the user cannot delete alternative data directly. Data records are deleted by the system at alternative or element deletion time. The data record is also deleted when a user chooses to change an alternative record from a local record back to an inherited record. The alternative record will now point to the parent alternative data. Data access layer preferably prevents setting alternative records for base (root) alternatives to "Not Local" (inherited), since base alternative do not have parents and thus cannot inherit data.

The modeling application data is edited at alternative data level. Data access layer typically does not impose limitations on the way alternative data is edited or the data that can be stored in the data records. The modeling application may add constraints on the data editing (e.g., pipe diameters should not be negative). When the alternative data is edited it is preferably always edited for the corresponding alternative in the current scenario. If this alternative is inherited and the edited data is "Not Local" (inherited) the user may edit the alternative data that is inherited from the parent alternative. If the alternative data is designated as "Local," the edited data will belong to the current child alternative.

The user preferably does not interact with the data access layer directly. Instead, in the illustrative embodiment of the invention, the user interacts with a COM™ object model to provide the user with a desired view of the model. For example, instead of looking at scenario, alternative, element, alternative data, and alternative record tables the user may interact directly with network elements. In the exemplary water distribution system, a user may edit pipes or assign demands to nodes. The user may then evaluate "What If?" scenarios by changing selected facets of the data. The object model preferably maps user requests into appropriate data access commands (i.e. add, edit, delete). This may be accomplished on two levels: managing scenarios and alternatives; and managing element data.

Numerous modifications to and alternative embodiments of the present invention will be apparent to those skilled in the art in view of the foregoing description. Accordingly, this description is to be construed as illustrative. Details of the embodiments may be varied without departing from the spirit and scope of the invention, and the exclusive use of all modifications, which come within the scope of the appended claims, is reserved.

What is claimed is:

1. A method of evaluating and modeling a hydraulic network, including the steps of:
   defining a modeling problem having a plurality of facets as a set of modeling parameters, including
   a) elements that correspond to portions of the hydraulic network being modeled,
   b) records that specify facet data that may be used with the elements, each record providing a persistent location for storing a particular value for facet data, and
   c) alternatives that each correspond to a single facet of the modeling problem, each alternative referencing particular elements and particular records to associatively link the particular elements to the facet data specified in the particular records to define corresponding aspects of the elements, each instance of an alternative defining aspects of the elements for a particular facet of the modeling problem, at least some alternatives being corresponding alternatives that link at least some particular elements to a same instance of facet data to share same facet data among the corresponding alternatives, and to link elements other than the at least some particular elements to a different instance of facet data to maintain local facet data that is not updated when facet data of one of the other corresponding alternatives is updated;
   storing the elements, the records, and the alternatives together in a hierarchical data structure maintained in a data storage system of a computer;
   providing the user with a scenario creation tool, operable by the user to select a single stored alternative from the hierarchical data structure for each of the plurality of facets in a particular modeling problem to produce a scenario;
   providing a geographic information system (GIS) client interface that provides a GIS client with facet data for the selected alternative for each of the plurality of facets that are part of the scenario; and
   running the scenario on an associated modeling solver program using the selected alternative for each of the plurality of facets.

2. The method as defined in claim 1 including the further step of:
   evaluating a hydraulic network model produced by that scenario.

3. The method as defined in claim 1 including the further step of:
   evaluating alternative "what if" scenarios by changing alternatives for selected facets.

4. The method as defined in claim 1 whereby the elements include pipes and the alternatives reference records that correspond to demands, such that the user may edit pipes or assign demands and evaluate a resulting "what if" scenario.

5. The method as defined in claim 3 including the step of managing and/or changing scenarios and alternatives.

6. The method as defined in claim 3 including the further step of managing and/or changing records.

7. A system for evaluating and modeling a hydraulic network, comprising:
   a data storage system of a computer configured to maintain a hierarchical data structure, the hierarchical data structure configured to store a set of modeling parameters that define a modeling problem having a plurality of facets, the modeling parameters including a) elements that correspond to portions of the hydraulic network being modeled,
b) records that specify facet data that may be used with the elements, each record to provide a persistent location for storage of a particular value for facet data,
c) alternatives that each correspond to a single facet of the modeling problem, each alternative to reference particular elements and particular records to associatively link the particular elements to the facet data specified in the particular records, to define corresponding aspects of the elements, each instance of an alternative defining aspects of elements for a particular facet, of a plurality of facets, of the modeling problem, at least some alternatives being corresponding alternatives that link at least some particular elements to a same instance of facet data to share same facet data among the corresponding alternatives, and to link elements other than the at least some particular elements to a different instance of facet data to maintain local facet data for that alternative, which is not updated when facet data of one of the other corresponding alternatives is updated; a scenario creation tool configured to select a single alternative from the hierarchical data structure for each of the plurality of facets of the modeling problem to produce a scenario;
a geographic information system (GIS) client interface configured to provide a GIS client with facet data for the selected alternative for each of the plurality of facets that are part of the scenario; and
a solver operable to run the scenario including the selected alternative for each of the plurality of facets of the modeling problem.

8. The system as defined in claim 7 wherein the hierarchical data structure is further configured to store the scenario, the scenario identifying the selected alternative for each of the plurality of facets of the modeling problem.

9. The system as defined in claim 7 wherein at least some alternatives contain an alternative record for one or more elements of the hydraulic network being modeled, each alternative record including a mapping between an element and a record.

10. The system as defined in claim 7 wherein the hierarchical data structure is further configured to arrange the alternatives in one or more inheritance trees, wherein inherited alternatives in the one or more inheritance trees inherent information from ancestor alternatives.

11. The system as defined in claim 7 wherein the scenario creation tool is configured to permit creation of various "what if" scenarios by changing the selected alternative for each of the plurality of facets of the modeling problem.

12. The system as defined in claim 7 wherein the plurality of facets of the modeling problem include one or more of physical alternatives, water demand alternatives, topological alternatives, and operation scheduling alternatives.

13. The system as defined in claim 7 wherein the scenario creation tool includes a graphical user interface (GUI) that provides alternative lists for a given alternative type to permit selection of the single alternative for each of the plurality of facet of the modeling problem.

14. A non-transitory computer-readable medium storing software for evaluating and modeling a hydraulic network, the software when executed operable to:
define a modeling problem having a plurality of facets as a set of modeling parameters, the modeling parameters including
a) elements that correspond to portions of the hydraulic network being modeled,
b) records that specify facet data that may be used with the elements, each record to provide a persistent location for storage of a particular value for facet data, and
c) alternatives that each correspond to a single facet of the modeling problem, each alternative referencing particular elements and particular records to associatively link the particular elements to the facet data specified in the particular records to define corresponding aspects of the elements, each instance of an alternative defining aspects of elements for a particular facet, of a plurality of facets, of the modeling problem, at least some alternatives being corresponding alternatives that link at least some particular elements to a same instance of facet data to share same facet data among the corresponding alternatives, and to link elements other than the at least some particular elements to a different instance of facet data to maintain local facet data for that alternative, which is not updated when facet data of one of the other corresponding alternatives is updated;
store the elements, the records, and the alternatives together in a hierarchical data structure;
select a single stored alternative from the hierarchical data structure for each of the plurality of facets of the modeling problem to produce a scenario;
provide a geographic information system (GIS) client with facet data for the selected alternative for each of the plurality of facets that are part of the scenario; and
run the scenario including the selected alternative for each of the plurality of facets of the modeling problem.

15. The non-transitory computer-readable medium as defined in claim 14 wherein the software when executed is further operable to:
store the scenario in the hierarchical data structure, the scenario identifying the selected alternative for each of the plurality of facets of the modeling problem.

16. The non-transitory computer-readable medium as defined in claim 14 wherein at least some alternatives contain an alternative record for one or more elements of the hydraulic network being modeled, each alternative record including a mapping between an element and a record.

17. A method for evaluating and modeling a hydraulic network, comprising:
defining a modeling problem involving the hydraulic network using a hierarchical data structure stored in a data storage system of a computer, the modeling problem having a plurality of facets that each represent an orthogonal dimension of the modeling problem, the hierarchical data structure including
a) elements that each correspond to a portion of the hydraulic network being modeled,
b) records that specify facet data that may be used with the elements, each record providing a persistent location for storing a particular value for the facet data, at least some facet data indicating values for physical properties of elements,
c) alternatives that each correspond to a single facet of the modeling problem, each alternative referencing particular elements and particular records to associatively link the particular elements to the facet data specified in the particular records to define the corresponding facet of the modeling problem, at least some alternatives being corresponding alternatives that link at least some particular elements to a same instance of facet data to share same facet data among the corresponding alternatives, and to link elements other than the at least some particular elements to a different instance of facet data to maintain local facet data for that alternative, which is not updated when facet data of one of the other corresponding alternatives is updated; and d) scenarios that each indicate a single alternative for each of the plurality of facets of the modeling problem, wherein multiple ones of the scenarios include alternatives that reference a same element and a same record for that element;

providing a user with a scenario creation tool, operable by the user to select the single alternative for each of the plurality of facets of the modeling problem to create each of the scenarios;

providing a geographic information system (GIS) client interface that provides a GIS client with facet data for the selected single alternative for each of the plurality of facets of the modeling problem in one of the scenarios; and executing one of the scenarios using the selected single alternative for each for each of the plurality of facets of the modeling problem in that scenario.

18. The method of claim 17, where at least some of the elements correspond to pipes of the hydraulic network being modeled.

19. The method of claim 18, wherein at least one of the plurality of facets represents pipe sizes and at least some of the records specify particular pipe sizes that may be used with the elements.

20. The method of claim 19, wherein at least one of the alternatives references the elements that correspond to pipes and records that specify particular pipe sizes for those pipes, to associatively link the elements that correspond to pipes to the pipe sizes.

21. The method of claim 17, wherein the alternatives comprise alternative records that map the particular elements to the particular records.

22. The method of claim 17, wherein the scenarios are a plurality of "what if" scenarios, and each "what if" scenario differs from each other by having at least one different alternative selected for one of the facets of the modeling problem.

23. A non-transitory computer-readable medium storing software for evaluating and modeling a hydraulic network, the software when executed operable to:

store a hierarchical data structure in a data storage system, the hierarchical data structure defining a modeling problem involving the hydraulic network that has a plurality of facets that each represent an orthogonal dimension of the modeling problem, the hierarchical data structure including a) elements that each correspond to a portion of the hydraulic network being modeled, b) records that specify facet data that may be used with the elements, each record to provide a persistent location for storage of a particular value for the facet data, at least some facet data to indicate values for physical properties of elements, c) alternatives that each correspond to a single facet of the modeling problem, each alternative to reference particular elements and particular records to associatively link the particular elements to the facet data specified in the particular records to define the corresponding facet of the modeling problem, at least some alternatives being corresponding alternatives that link at least some particular elements to a same instance of facet data to share same facet data among the corresponding alternatives, and to link elements other than the at least some particular elements to a different instance of facet data to maintain local facet data for that alternative, which is not updated when facet data of one of the other corresponding alternatives is updated; and d) scenarios that each indicate a single alternative for each of the plurality of facets of the modeling problem, wherein multiple ones of the scenarios include alternatives that reference a same element and a same record for that element;

provide a user with a scenario creation tool, operable by the user to select the single alternative from the hierarchical data structure for each of the plurality of facets of the modeling problem to create each of the scenarios;

provide a geographic information system (GIS) client interface that provides a GIS client with facet data for the selected single alternative for each of the plurality of facets of the modeling problem in one of the scenarios; and execute one of the scenarios using the selected single alternative for each for each of the plurality of facets of the modeling problem in that scenario.

24. The non-transitory computer-readable medium as defined in claim 23, wherein at least some of the elements correspond to pipes of the hydraulic network being modeled, at least one of the plurality of facets represents pipe sizes, and at least some of the records specify particular pipe sizes.

25. The non-transitory computer-readable medium as defined in claim 24, wherein at least one of the alternatives references the elements that correspond to pipes and one or more records that specify particular pipe sizes for those pipes, to associatively link the elements that correspond to pipes to the pipe sizes.

26. The non-transitory computer-readable medium as defined in claim 23, wherein the alternatives comprise alternative records that map the particular elements to the particular records.

27. The non-transitory computer-readable medium as defined in claim 23, wherein the one or more scenarios are a plurality of "what if" scenarios, and each "what if" scenario differs from each other by having at least one different alternative selected for one of the facets of the modeling problem.

* * * * *